(No Model.) 2 Sheets—Sheet 2.
J. WOOLSONCROFT.
CULTIVATOR.
No. 536,500. Patented Mar. 26, 1895.
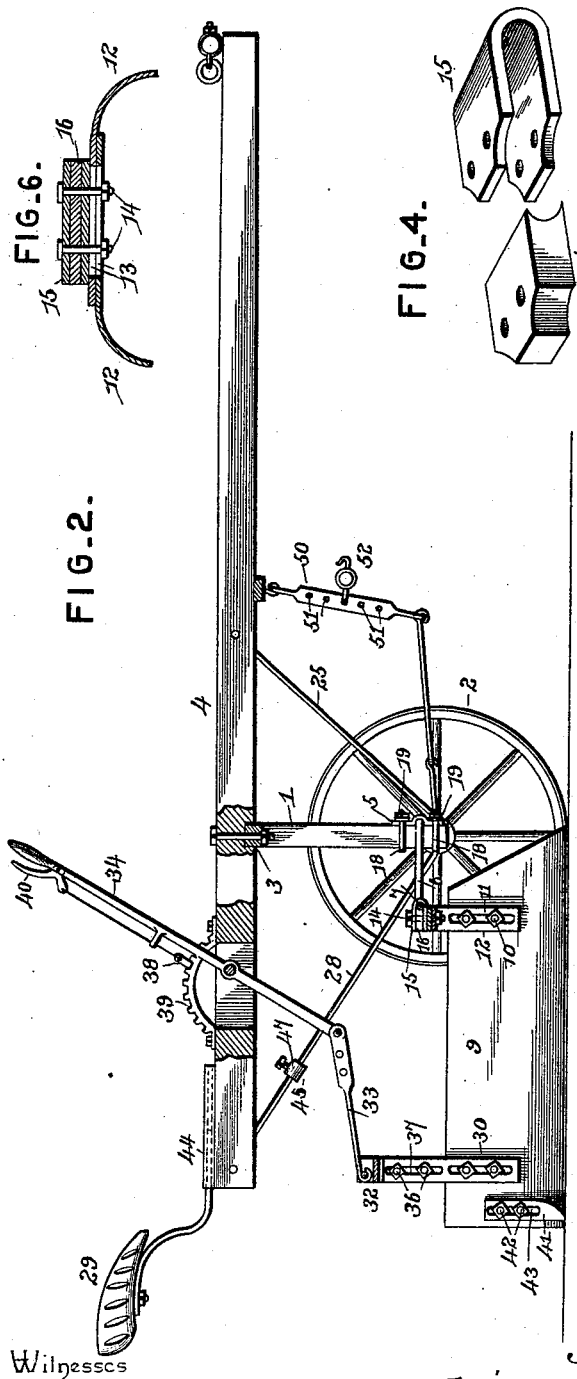
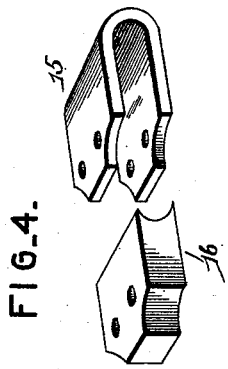
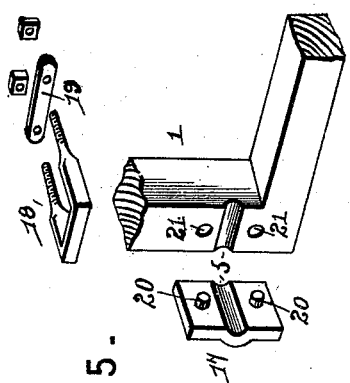
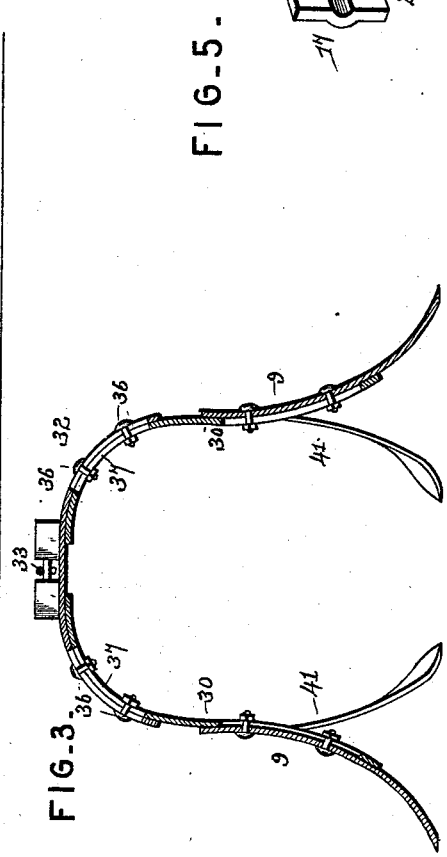
Witnesses
Jas. K. McCathran
J. F. Riley
Inventor
John Woolsoncroft
By his Attorneys.
C. A. Snow & Co.
THE NORRIS PETERS CO., PHOTO-LITHO., WASHINGTON, D. C.

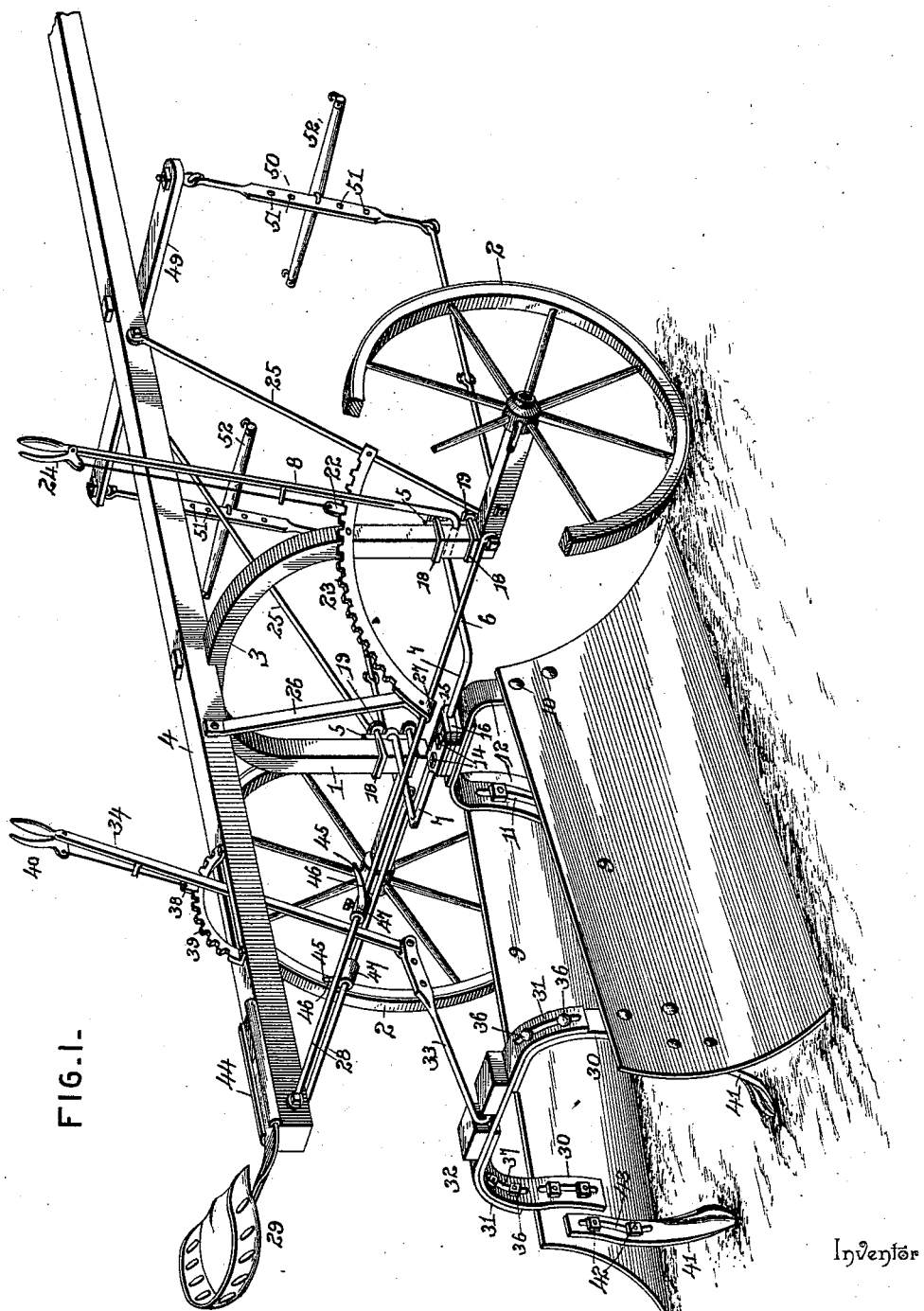

UNITED STATES PATENT OFFICE.

JOHN WOOLSONCROFT, OF SENECA, KANSAS.

CULTIVATOR.

SPECIFICATION forming part of Letters Patent No. 536,500, dated March 26, 1895.

Application filed March 31, 1894. Serial No. 505,898. (No model.)

*To all whom it may concern:*

Be it known that I, JOHN WOOLSONCROFT, a citizen of the United States, residing at Seneca, in the county of Nemaha and State of Kansas, have invented a new and useful Cultivator, of which the following is a specification.

The invention relates to improvements in cultivators.

The object of the present invention is to improve the construction of surface cultivators for listed, drilled or check-row corn, cotton, potatoes, or any other field crop requiring cultivation, to enable the share shovels to drop into the furrows, in order to plow the earth on both sides to suit the operator and as close to young growing plants as occasion requires to lighten the draft, to regulate the depth of the share shovel, and to enable the latter to be readily lifted clear of the ground to facilitate turning, and to enable the cultivator to be transferred from one field to another.

The invention consists in the construction and novel combination and arrangement of parts, hereinafter fully described, illustrated in the accompanying drawings, and pointed out in the claims hereto appended.

In the drawings—Figure 1 is a perspective view of a cultivator constructed in accordance with this invention. Fig. 2 is a longitudinal sectional view. Fig. 3 is a transverse sectional view. Fig. 4 is a detail perspective view of the bearing of the front hanger, the parts being separated. Fig. 5 is a similar view of one of the bearing of the shaft. Fig. 6 is a detail sectional view of the front hanger.

Like numerals of reference indicate corresponding parts in all the figures of the drawings.

1 designates a drop axle, having journaled on its ends carrying wheels 2, and provided with a central arched portion 3, to the top of which is secured a draft beam 4; and the drop axle is adapted to permit the cultivator to straddle a row as will be readily understood. At the lower terminals of the sides of the arched portion 3 is journaled in suitable bearings 5, a rock-shaft 6 having a central rectangular crank bend 7, and provided at one end with an upward extending arm 8, forming a handle or lever for operating the rock-shaft. The rock-shaft has suspended from its crank bend a pair of longitudinally disposed share shovels 9, which serve as fenders, and which plow the earth at both sides of a hill. The longitudinally disposed share shovels 9 are curved, and present outer concave faces, and inner convex faces.

The front ends of the share shovels are adjustably secured by means of bolts 10 to the lower slotted portions 11 of oppositely curved hanger bars 12, which have their upper ends 13 slotted and adjustably secured by means of bolts 14 to a bearing box or loop 15, which receives in its bend or rounded portion the crank bend 7, and the latter is retained in the bearing box or loop by a block 16, detachably secured in position by means of the bolts 14.

The bearings 5 of the crank-shaft or rock-shaft 6 consist of grooves disposed horizontally on the front faces of the sides of the arched portion of the drop axle, and plates 17 which have corresponding grooves, and which are secured to the axle above and below the grooves by clips 18 having tie-plates or clip-plates 19 and nuts, which are arranged on the threaded ends of the clips. In order to prevent the bearing plate 17 from slipping, it is provided at its inner face above and below the groove with cylindrical grooves 20, which fit in corresponding sockets 21 of the axle.

The rock-shaft is retained at any desired adjustment by a spring actuated pawl or detent 22, which engages a segmental rack 23; and the pawl or detent is connected with a detent lever or latch lever 24. The front end of the curved rack 23 is secured to one of a pair of front inclined brace rods 25, which extend upward from the axle to the draft beam, and the rear end of the rack 23 is connected with the draft beam by an arm 26 preferably formed integral with the rack. At the angle formed by the rack 23 and arm 26 is provided an eye 27, formed by looping the metal and receiving one of a pair of rear brace rods 28, inclining upward and rearward from the axle to the draft beam, and attached to the latter below an adjustable seat 29.

The rear portions of the shovel shares are detachably secured to lower slotted portions 30 of side extensions 31 of a rear hanger 32, which is connected by a rod 33 with an operating lever 34. The upper portions 35 are slotted and the extensions 31 are adjustably connected by bolts 36 with the ends of the hanger 32, which is provided with slots 37 receiving the bolts 36.

The adjustable connections at the front and rear of the share shovels permit the latter to have their positions readily changed, and to be easily adjusted and arranged at any desired angles to suit the size of listed furrows, or the distance it is desired to throw the soil or the amount of soil to be cut away. The detachability of the share shovels permits them to be changed from right to left and to present inner opposite concave faces, whereby they are adapted for cutting out centers and ridges for filling up furrows, and at the same time pulverizing the soil. Instead of covering weeds, the latter will be thrown off to expose their roots to the sun.

The operating lever 34 is fulcrumed on the draft beam preferably in an opening or slot thereof, and it carries the latch mechanism consisting of a spring actuated pawl or detent 38 engaging a segmental rack 39 and connected with a latch or detent lever 40. The operating handle or arm 8 is located at the outside of its rack 23, in order to enable the latter to be secured to the arch of the axle, thereby greatly strengthening the construction.

The share shovels have adjustably secured to the inner faces of their rear ends a pair of oppositely disposed inwardly extending rear shovels 41, which have their lower ends curved, and which are adapted to draw the loose soil close to the young growing plants. The shanks or upper portions of the shovels 41 are secured in their adjustment by means of bolts 42, and are provided with longitudinal slots 43 to permit such adjustment.

The seat 29 is adjustably mounted on the rear end of the draft beam in a groove or way of a plate 44; and the rear inclined brace rods are provided with adjustable foot rests 45 consisting of curved arms 46 and sockets or eyes 47, which carry clamping screws 48 to secure them in their adjustment.

The draft beam has secured to it in advance of the carrying wheels a transverse doubletree bar 49 to the ends of which are secured the upper ends of suspended rods 50 provided with series of perforations 51 to permit vertical adjustment of singletrees 52, and having their lower ends connected with the axle by rods.

It will be seen that the straddle row cultivator is adapted for cultivating listed, drilled, check-row corn, cotton or any other field crop, that the operator has perfect control of the shovel shares, and can drop them into the furrows in order to plow the soil at both sides of and as close to young plants as desired, or may be found necessary, that by the rear shovels the loose soil is drawn close to the plant, and that the shovel shares are both adjustable to change their slant or angle, and detachable to change their position from one side to the other. It will also be seen that the means for suspending the shovel shares permit them to be arranged at an inclination or in a slanting position, and that they may be readily elevated clear of any obstruction to permit the cultivator to turn readily, or to be driven from one field into another.

Changes in the form, proportion, and the minor details of construction may be resorted to without departing from the principle or sacrificing any of the advantages of this invention.

What I claim is—

1. In a cultivator, the combination with a drop axle, of a rock-shaft journaled on the axle and having a bend or loop arranged below the arch of the axle, and adapted to swing within the same, a handle or operating lever connected with the rock-shaft, the longitudinally disposed share shovels having their front portions loosely suspended from the crank bend or loop of the rock-shaft a hanger supporting the rear portions of the share shovels, and a lever connected with the hanger for raising and lowering the same, substantially as described.

2. In a cultivator, the combination with a drop axle, of a rock-shaft journaled on the axle and provided with a crank loop or bend arranged below the arch of the axle, and adapted to swing within the same, a handle or lever connected to the rock-shaft, a hanger journaled on the loop or bend of the shaft, a rear hanger, a lever for raising and lowering the rear hanger, and a longitudinally disposed share shovel adjustably and detachably secured to said hanger, substantially as described.

3. In a cultivator, the combination of a drop axle, a rock-shaft journaled on the axle and provided with a crank bend, adapted to swing within the arch of the axle, a handle or operating lever connected to the rock-shaft a front hanger journaled on the crank bend and composed of two adjustable bars having depending lower portions, a rear hanger provided with depending adjustable side extensions, a lever for raising and lowering the rear hanger, and the longitudinally disposed share shovels adjustably secured to the hangers, substantially as described.

4. In a cultivator, the combination of a drop axle, a rock-shaft journaled on the axle and provided with a crank bend, arranged to swing within the arch of the axle, a handle or operating lever connected to the rock-shaft a front hanger journaled on the crank bend and composed of two adjustable bars having depending lower portions, a rear hanger provided with depending adjustable side extensions, a lever for raising and lowering the rear hanger, the longitudinally disposed share shovels adjustably secured to the hangers, and the inwardly extending rear shovels adjustably secured to the inner faces of the share shovels, and having their lower ends extended inward, substantially as described.

5. In a cultivator, the combination of a drop axle, a rock shaft journaled on the axle and provided with a crank bend, the bearing box 15 provided with a block and mounted on the crank bend, the front depending hanger bars having slotted terminals and adjustably secured by bolts to the bearing box, the curved rear hanger having slotted ends and provided with extensions having slots at their ends, bolts connecting the extensions to the rear hanger adjustably, the longitudinal share shovels, and bolts arranged in slots of the hangers and adjustably securing the share shovels to them, substantially as described.

6. In a cultivator, the combination of a drop axle, a draft beam secured thereto, the front and rear inclined brace rods extending upward from the axle and secured to the draft beam, a curved rack arranged at one side of the cultivator and secured to the adjacent brace rods and to the arch of the axle and provided at its rear end with an integral arm forming an eye to receive the rear brace rod and extending therefrom to the draft beam, the rock-shaft journaled on the axle and provided with an operating arm arranged adjacent to the rack, and a spring actuated pawl mounted on the operating arm and engaging the rack, substantially as described.

7. In a cultivator, the combination of a drop axle, a draft beam secured to the arch thereof and extending rearwardly therefrom, the rear inclined brace rods extending from the draft beam to the axle, a seat mounted on the draft beam, an adjustable foot rest secured to the brace rods, substantially as described.

8. In a cultivator, the combination of a drop axle, a draft beam secured to the arch thereof and extending rearward therefrom, the front and rear inclined brace rods arranged in pairs and extending from the draft beam to the axle, a rock-shaft mounted on the axle and provided with a crank bend located beneath the arch, said shaft being provided at one end with an operating arm or handle, an operating lever fulcrumed on the draft beam and located in rear of the axle, the longitudinally disposed share shovel, the front and rear hangers connecting the share shovels, the front hanger being suspended from the crank bend of the shaft, and connections between the rear hanger and the operating lever, substantially as described.

9. In a cultivator, the combination of a supporting frame, a pair of longitudinally disposed shovel shares, having outer concave faces and inner convex faces, the inwardly curved rear shovels adjustably secured to the inner faces of the longitudinally disposed shovels and located at the rear ends thereof, and means for raising and lowering the shovels, substantially as described.

In testimony that I claim the foregoing as my own I have hereto affixed my signature in the presence of two witnesses.

JOHN WOOLSONCROFT.

Witnesses:
J. L. BREEDING,
G. W. HOYLE.